(12) United States Patent
Tirkel

(10) Patent No.: US 7,218,234 B2
(45) Date of Patent: May 15, 2007

(54) ELECTRONIC BAIT STATION

(75) Inventor: Anatol Zygmunt Tirkel, East Brighton (AU)

(73) Assignee: J I Peston Pty Ltd, Archefield (AU)

( * ) Notice: Subject to any disclaimer, the term of this patent is extended or adjusted under 35 U.S.C. 154(b) by 173 days.

(21) Appl. No.: 11/041,787

(22) Filed: Jan. 24, 2005

(65) Prior Publication Data

US 2005/0134466 A1    Jun. 23, 2005

Related U.S. Application Data

(63) Continuation-in-part of application No. PCT/AU03/00936, filed on Jul. 24, 2003.

(30) Foreign Application Priority Data

Jul. 24, 2002    (AU) .............................. 2002950326

(51) Int. Cl.
- *G08B 1/08* (2006.01)
- *G08B 13/18* (2006.01)
- *G08B 13/24* (2006.01)
- *G01N 29/00* (2006.01)
- *A01M 1/20* (2006.01)
- *A01M 1/24* (2006.01)

(52) U.S. Cl. .............................. 340/573.2; 340/539.1; 340/551; 340/552; 340/561; 73/584; 73/587; 43/124; 43/131; 43/132.1

(58) Field of Classification Search ............. 340/573.2, 340/551–552, 539.1; 43/131, 132.1, 124; 73/587, 584
See application file for complete search history.

(56) References Cited

U.S. PATENT DOCUMENTS

| | | | |
|---|---|---|---|
| 5,521,600 A | 5/1996 | McEwan | |
| 5,555,672 A | 9/1996 | Thorne et al. | |
| 5,575,105 A | 11/1996 | Otomo | |
| 5,691,602 A * | 11/1997 | Suzuki | 315/5.48 |
| 5,778,596 A | 7/1998 | Henderson et al. | |
| 5,877,422 A | 3/1999 | Otomo | |
| 5,937,571 A * | 8/1999 | Megargle et al. | 43/131 |
| 6,195,934 B1 | 3/2001 | Megargle et al. | |
| 6,233,865 B1 * | 5/2001 | Curtis et al. | 43/131 |
| 6,313,643 B1 | 11/2001 | Tirkel et al. | |
| 6,445,301 B1 * | 9/2002 | Farrell et al. | 340/573.2 |
| 6,584,728 B2 * | 7/2003 | Aesch et al. | 43/132.1 |
| 6,801,131 B2 * | 10/2004 | Donskoy et al. | 340/573.1 |
| 6,937,156 B2 * | 8/2005 | Gardner et al. | 340/573.2 |
| 7,020,996 B2 * | 4/2006 | Beroza et al. | 43/124 |

FOREIGN PATENT DOCUMENTS

| | | |
|---|---|---|
| AU | 708025 | 11/1997 |
| WO | WO 96/10241 | 4/1996 |
| WO | WO 2004/008848 A1 | 1/2004 |

* cited by examiner

*Primary Examiner*—Daniel Wu
*Assistant Examiner*—Lam Pham

(57) ABSTRACT

An electronic bait station utilising the disruption of an electromagnetic field to detect the movement of insects or small animals within the station. The bait station consists of a housing, with at least one cavity having an electromagnetic radiation element generating an electromagnetic field in the cavity, and an electromagnetic receiving element detecting the electromagnetic field. Movement of an insect or small animal in the cavity causes a change in the electromagnetic field, which is detected.

The preferred bait station comprises an outer cavity and a coaxial inner cavity, each with an electromagnetic field. This arrangement allows the direction of movement of insects and small animals to be determined and minimises the occurrence of spurious signals.

22 Claims, 7 Drawing Sheets

ELECTRONIC BAIT STATION

CROSS REFERENCES TO RELATED APPLICATIONS

This application is a Continuation in Part of PCT/AU03/00936 filed on Jul. 24, 2003.

TECHNICAL FIELD OF THE INVENTION

This invention relates to a device for detecting insects and pests and in particular, detecting the presence of insects in a bait station.

BACKGROUND OF THE INVENTION

The destructive nature of pests, in particular termites, which ingest the wood of structures and other materials, is well known. The detection of the presence of termites and pests is vital in controlling and abating pest infestation in an area.

There are numerous conventional devices which detect the presence of termites or pests. One such device is described in U.S. Pat. No. 5,555,672 wherein a termite detection and control system is provided by a subterranean bait station. The bait station comprises removable cartridges having partitions containing bait material to attract termites. Once termite presence is detected, the bait in one of the cartridges is replaced with bait induced with pesticide.

Another apparatus is described in Australian Patent 708025. A cellulose monitoring device is housed in a durable station housing which is periodically observed to detect activity of isopteran insects. The insects are eliminated using a toxicant-containing matrix enclosed in the durable station housing.

A further termite bait apparatus is known from U.S. Pat. No. 5,778,596. The apparatus has two compartments, a non toxic and a toxic compartment. A passage, initially blocked by a plug which the termites can eat through, connects the two compartments. Termites placed in the non toxic compartment feed on non-toxic food. An exit from the non-toxic compartment leads to the shelter of a target termite colony. The target termite colony then slowly enters the non-toxic compartment and eventually the toxic compartment.

Yet another bait station is described in U.S. Pat. No. 6,195,934. A termite bait station uses a cellulose bait impregnated with a slow acting toxicant to control and eliminate termites.

The above systems and methods detect the presence of termites and pests in an area and eradicate them using toxicant-bait. However, these systems require constant visual monitoring of the bait stations to ascertain the presence of pests and termites. Often, termite colonies and pests are well established before they are detected.

The above systems are limited to the detection of insects and generally are not extendible to small animals such as mice and rodents.

OBJECT OF THE INVENTION

It is an object of the invention to provide an improved bait station for detecting the presence of insects and pests.

SUMMARY OF THE INVENTION

In one form, although it need not be the only or indeed the broadest form, the invention resides in a bait station comprising:
  a housing;
  at least one cavity formed within said housing;
  a plurality of openings for permitting insects or small animals to enter and exit said bait station;
  at least one electromagnetic radiation element generating an electromagnetic field in said at least one cavity;
  at least one electromagnetic receiving element detecting the electromagnetic field in said at least one cavity; wherein
  the at least one electromagnetic receiving element detects changes in the electromagnetic field in said at least one cavity caused by the ingress or egress of said insects or said small animals.

Preferably the bait station comprises an inner cavity and an outer cavity formed within said housing.

Suitably the bait station further comprises at least one opening formed in a wall of each of the inner cavity and outer cavity for insects or small animals to enter and exit said bait station.

Preferably the inner cavity is contained within and is coaxial with the outer cavity. The outer cavity may be formed by an outer wall of the housing.

Preferably there is at least one electromagnetic radiation element in each of said inner and outer cavities, and at least one electromagnetic receiving element in each of said inner and outer cavities.

The bait station may include memory means that stores data including one or more of: received electromagnetic field, status of said cavities, status of a bait dispenser and a battery status.

The electromagnetic field received at the electromagnetic receiving elements may be processed for storing as digital data in the memory.

Activity in the bait station such as change in electromagnetic field in the cavities can be sent to a remote location via an onboard bidirectional RF link in the bait station.

The electromagnetic receiving element may be interrogated periodically or on demand by a processor.

Preferably, the electromagnetic receiving elements operate in a standby mode until an activity such as a change in the electromagnetic field is detected.

In another aspect of the invention there is provided a method of detecting the presence of insects or small animals in a bait station having a housing, at least one cavity formed in the housing and a plurality of openings permitting ingress or egress of said insects or said small animals, said method including the steps of:
  generating an electromagnetic field in at least one cavity formed within the housing of said bait station; and
  detecting a change in the electromagnetic field in said at least one cavity caused by the ingress or egress of said insects or said small animals.

DETAILED DESCRIPTION OF THE PREFERRED EMBODIMENT

In a preferred form, the invention will be described with reference to a bait station having inner and outer cavities suitable for termites and other pests. However, it should be noted that the invention can also be realised with a single cavity and the bait station can be used for small animals.

Figure 1:
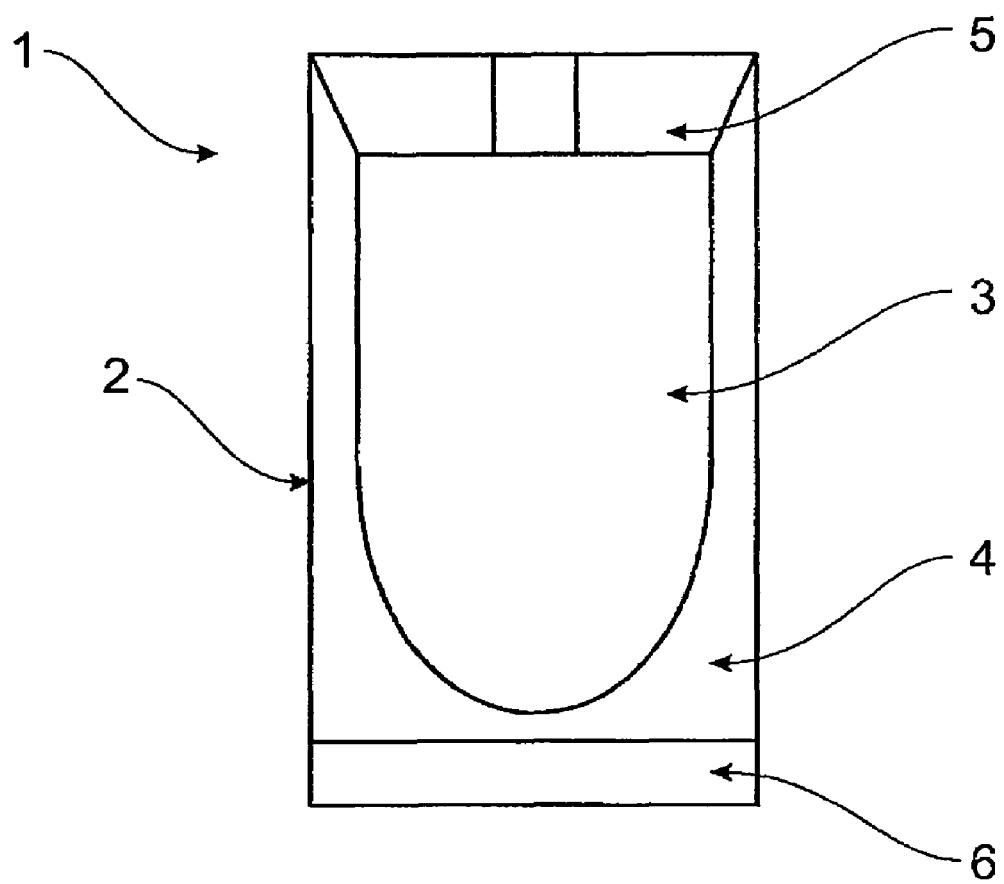
FIG. 1 is a schematic view of a first embodiment of a bait station in accordance with the invention.

In a preferred form of the invention, there is generally shown in FIG. 1 a schematic view of a bait station 1 having a housing 2. An inner cavity 3 is contained within and is coaxial with an outer cavity 4 formed with an outer wall of housing 2. A bait dispenser 5 contains a bait to attract insects and termites for detection and capture. The bait may contain toxicants to eradicate the termites. An electronics compartment 6 encloses a power supply and electronics for generating, detecting and processing electromagnetic radiation signals.

Figure 2:
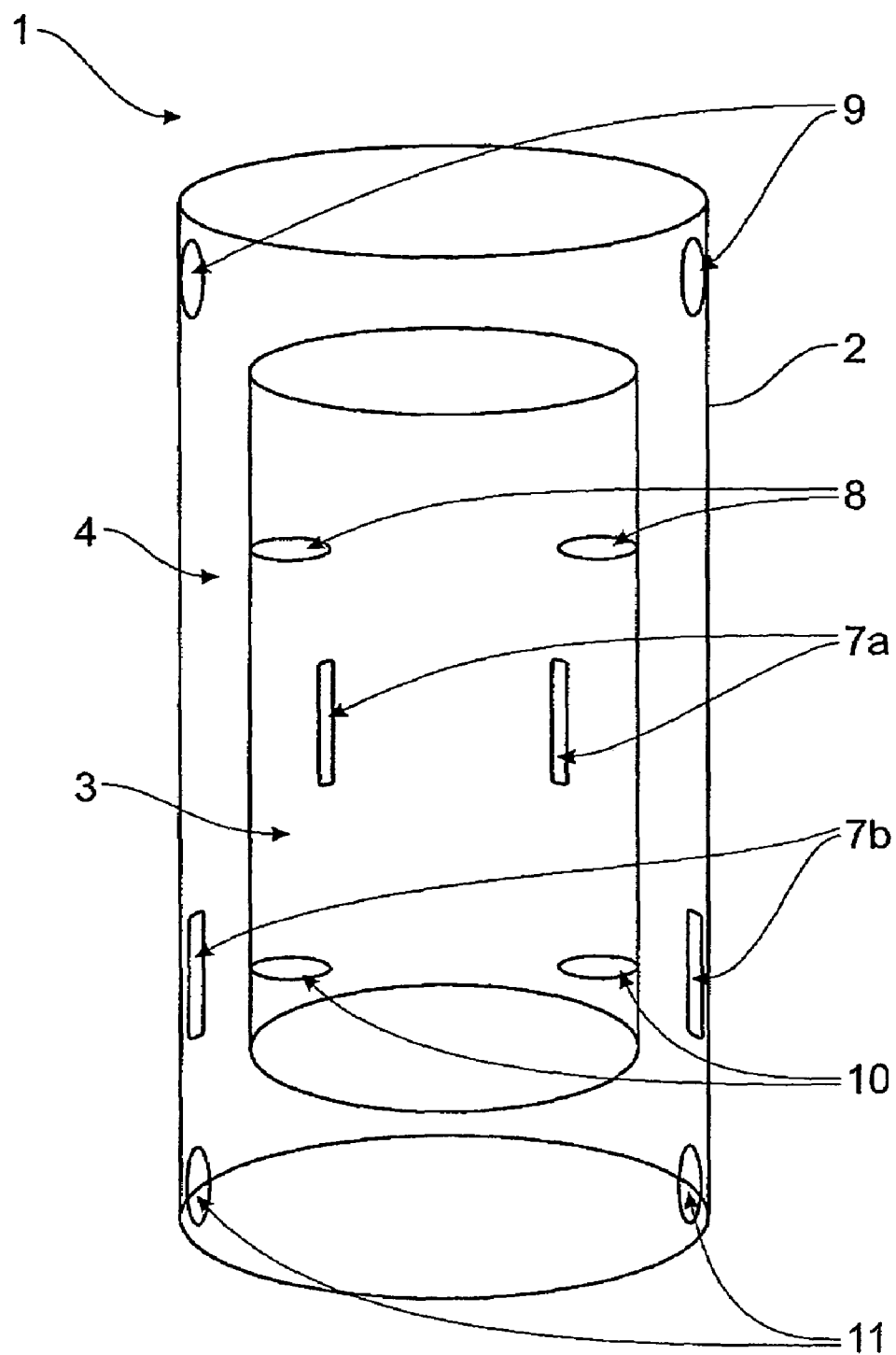
FIG. 2 is a detailed schematic illustration of a bait station in accordance with the first embodiment of the invention.

Referring now to FIG. 2, the bait station 1 further includes inner cavity openings 7a and outer cavity openings 7b formed in the respective walls to permit termites to enter and exit each of the inner cavity 3 and outer cavity 4. The number of cavity openings can vary depending on the application of the bait station. In the case of detection of termite activity in an area, two or more cavity openings are suitable.

The bait station is provided with inner cavity electromagnetic radiation elements, in the form of transmission antenna 8 contained in the inner cavity 3, and outer cavity electromagnetic radiation elements, in the form of transmission antenna 9 contained in the outer cavity 4. The electromagnetic antennas can take the form of a loop or dipole tuned to the required frequency of operation.

Corresponding inner and outer cavity electromagnetic receiving elements 10 and 11 in the form of receive antennas, receive the electromagnetic signal transmitted by the respective transmission antennas, 8 and 9.

For simplicity the signal transmission lines between the electronics compartment 6 and the antennas 8, 9, 10, 11 have been omitted.

The housing 2 of the bait station 1 may be formed with an outer metallised cover defining the outer cavity 4. Similarly, the inner cavity may also be formed from a metallised structure. The electromagnetic field generated in the cavities may involve microwave frequencies. The metallised structures of the cavities isolate the microwave field in the respective cavities. As will be well known to a person skilled in the art, metallic material provides an effective shield from microwave radiation. Alternatively, other suitable materials can be used, such as hardened (metallised) plastic or the like which termites cannot ingest.

Figure 3:
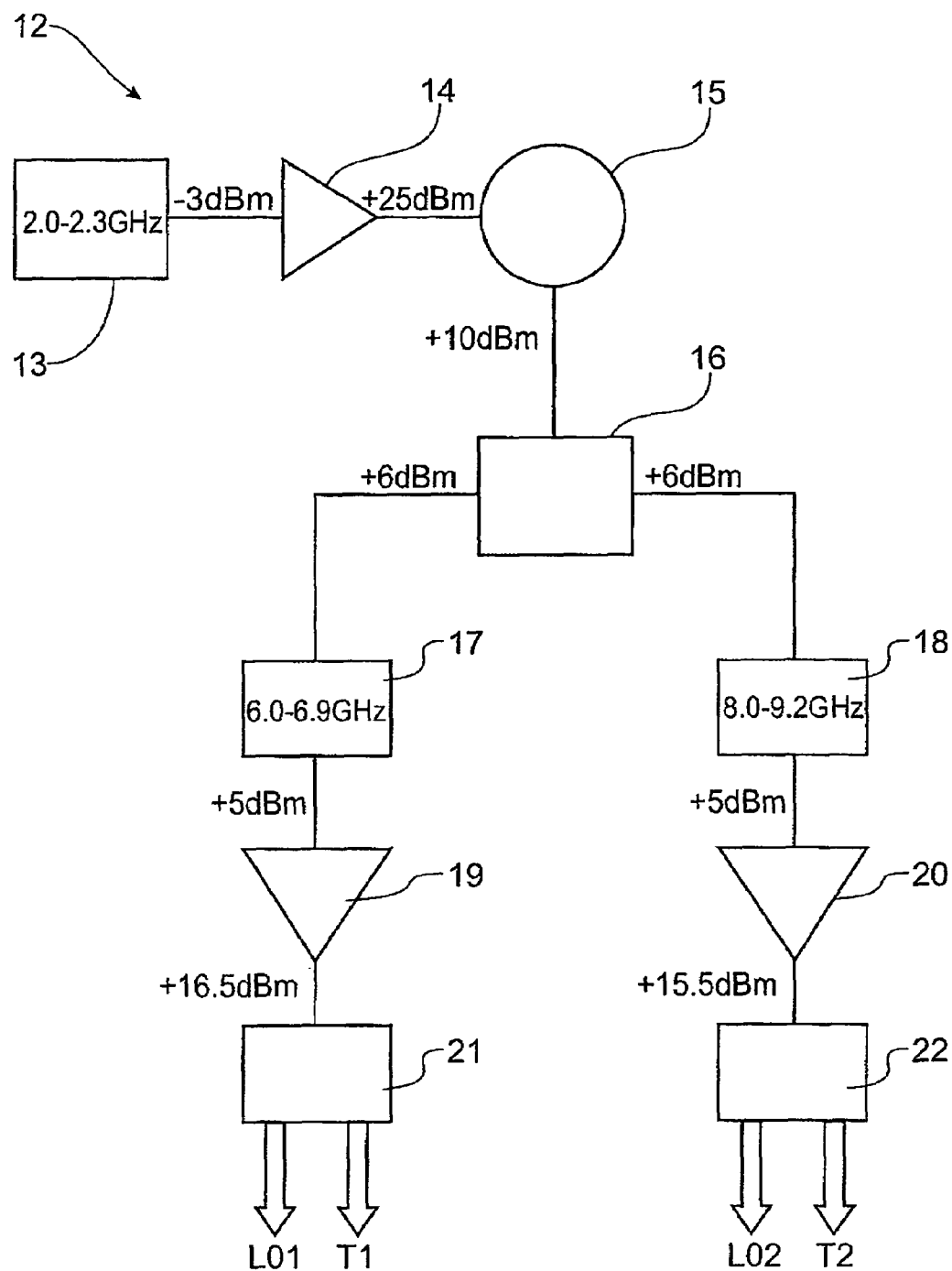
FIG. 3 is a block diagram of an embodiment of a transmission circuit of a bait station in accordance with the invention.

The transmission antennas 8 and 9 for the respective inner and outer cavities may be of loop or dipole configuration. Referring to FIG. 3, a transmission circuit 12 of the bait station is shown. Antennas 8 and 9 are energised by a voltage controlled oscillator (VCO) 13. The output frequency of VCO 13 is amplified by amplifier 14 and tuned to a resonance frequency of the cavities by an Automatic Frequency Control (AFC) loop (not shown). FIG. 3 shows a comb generator 15 (such as Alpha CVB 1031), which produces multiple harmonics of the VCO signal, and enables the simultaneous excitation of both cavities from the same oscillator. Using this technique, the VCO 13 can operate in the 2.4 GHz band, significantly reducing costs. The VCO 13 can be locked to the peak of the resonance frequency or to a high gradient skirt of the resonance curve.

The tuned output signal from the comb generator 15 is split by Wilkinson splitter 16 into two signals for the respective transmission antennas 8 and 9. The respective signals are bandpass filtered by filters 17 and 18 and amplified by amplifiers 19 and 20. Couplers 21 and 22 connect and supply the transmission signals T1, T2 to the transmission antennas 8 and 9, and the local oscillator drive LO1, LO2 to the receiver mixers 30 and 31 (shown in FIG. 4).

Power to the bait station is provided by a suitable battery pack. Transmission circuit 12 and battery pack may be separate from the bait station 1 or attached to the bottom (as shown in FIG. 1), top or side.

Figure 4:
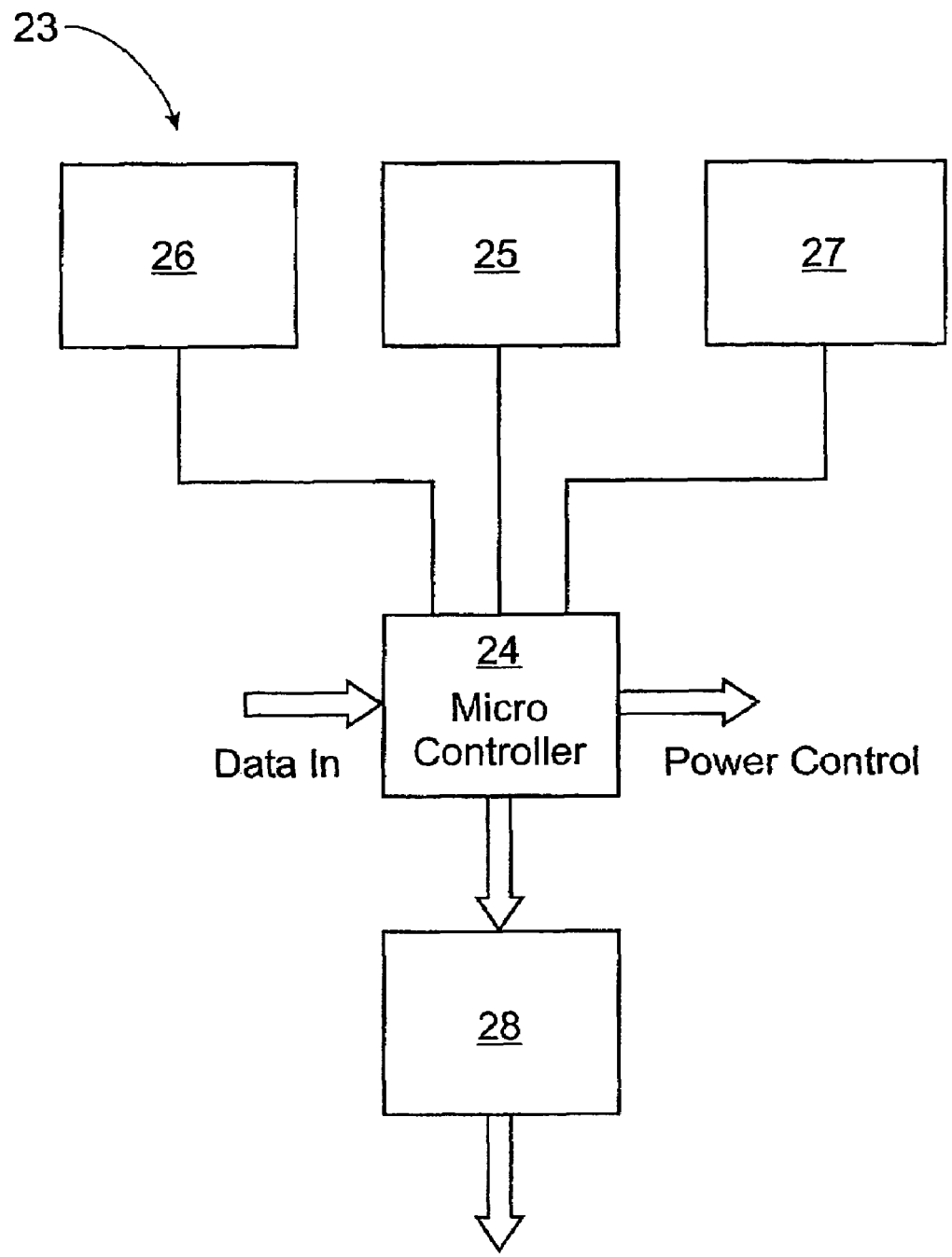
FIG. 4 is a block diagram of a receiver circuit of a bait station in accordance with the invention.
Figure 5:
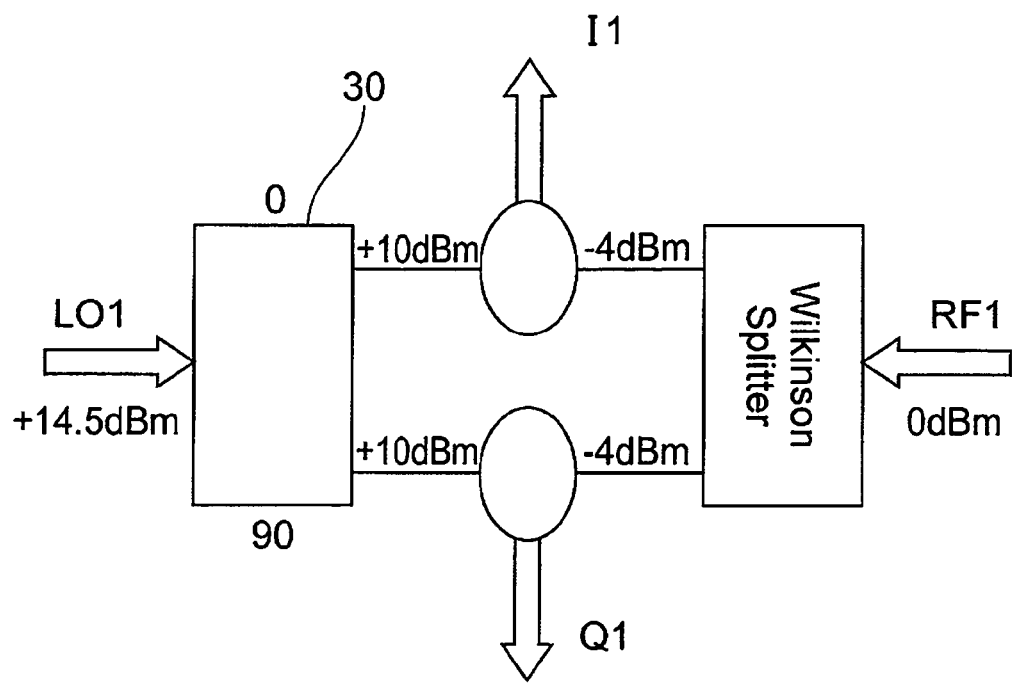
FIG. 5 is a block diagram of a signal acquisition circuit of the bait station in accordance with the invention.
Figure 5:
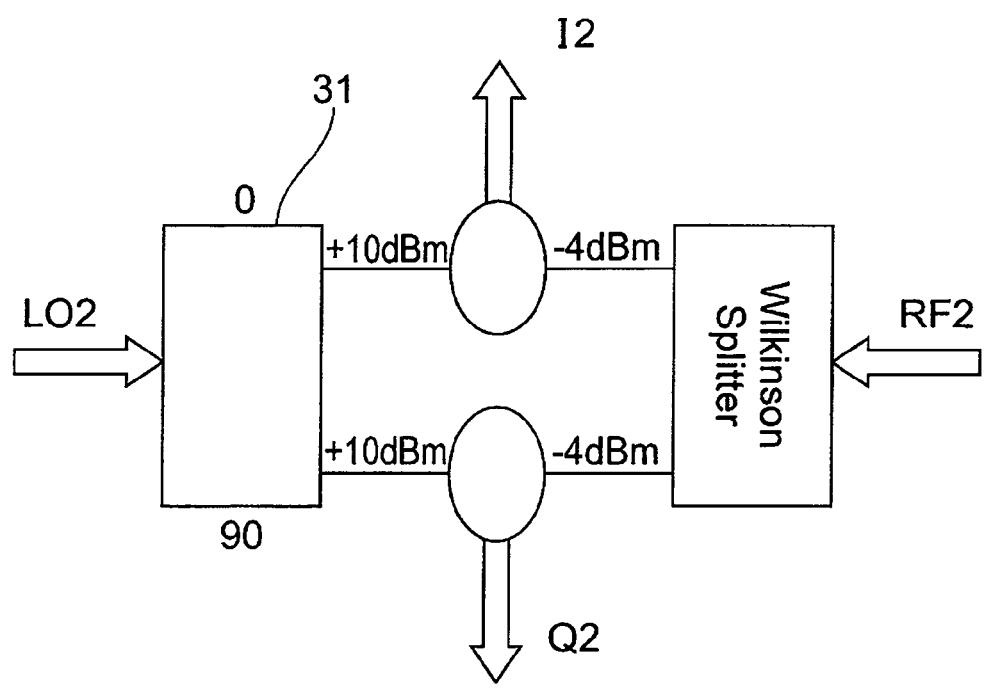
Figure 6:
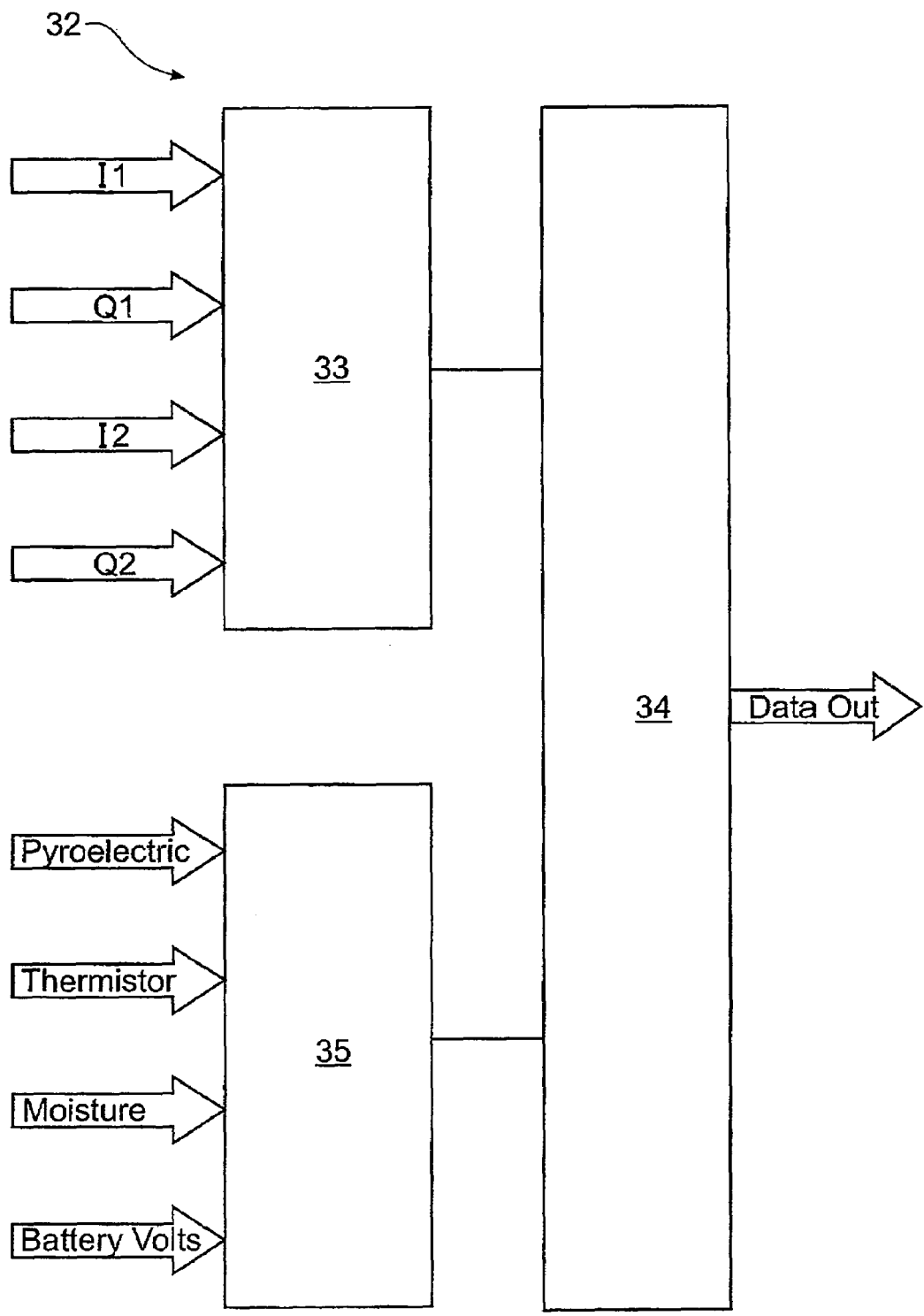
FIG. 6 is a block diagram of a control circuit of the bait station in accordance with the invention.

Referring now to FIG. 4, a bait station receiver circuit 29 is shown. Received signal RF1 for the inner cavity and RF2 for the outer cavity are downconverted by mixer circuits 30 and 31 respectively. The mixers are quadrature mixers, producing I and Q signals for each of the cavities. The received signals are henceforth processed as complex numbers, and converted from Cartesian to polar format by the microprocessor 24 (FIG. 6). Thus magnitude and phase of the received signals is available for further processing. The downconverted signals are amplified, buffered and low pass filtered 33 as shown in FIG. 5. The filtered signal is converted by an analogue to digital converter 34 into a digital value and stored in a flash memory 25 using standard conversion techniques. Any suitable conventional equipment housed at the bait station or located at a remote site may do the conversion.

Signal acquisition circuit 32 of FIG. 5 may also receive signals from sensors detecting moisture content of the cavities, battery status, temperature, vibration or air movement and other conditions of the bait station capable of being sensed electronically. The signals are received, buffered and filtered by a four channel buffer 35 and converted to digital data by an analog to digital converter 34. The digital data is stored in a flash memory 25 as shown in FIG. 6. All of these functions can be performed by a single chip microconverter, such as the Analog Devices AduC834.

Referring now to FIG. 6 in detail, there is shown a control circuit 23 of the bait station. Any disturbances and fluctuations in the received electromagnetic field signal at the receive antennas 10 and 11 is processed by a microprocessor 24 and stored as digital data in a memory 25. Alternatively, the digital data can be transmitted to a remote location via an onboard bidirectional RF link 26, for further evaluation including, status of said cavities, status of bait dispenser 5, size of insect, number of insects, etc. Changes in the amplitude or phase of the electromagnetic field in either of the cavities can be analysed. The temporal nature of these changes and the order in which they occur in the two cavities can be used to determine insect ingress or egress and discriminate against spurious effects such as ingress of inanimate matter (dirt, water, snow etc or environmental effects such as movement, vibration). Changes which are incommensurate with these spurious effects and commensurate with temporal patterns of insect activity, indicate the likely presence of insects such as termites in cavities 3 and 4, their numbers and type of activity (ingress, egress, or feeding). Criteria for discrimination of these changes in electromagnetic field can be fixed from laboratory experiment results. Adaptive techniques and database updates can be used to refine this detection process. Microprocessor 24 can also be programmed via EEPROM 27. A digital to analog converter 28 converts control signals from microprocessor 24 to tune the AFC loop of the transmission circuit 12 in FIG. 3.

The bait station of the present invention allows the detection of the presence of pests and in particular termite activity in an area. The bait station does not require visual inspection by a user to determine the presence of termites.

The operation of the bait station will now be described in more detail with reference to the inner and outer cavities.

The inner cavity transmission antenna 8 is energised to radiate a high order mode of electromagnetic signal, such as, but not restricted to $TM_{m1n}$ where, m and n are mode numbers resulting in a complex pattern of electromagnetic field (Transverse Magnetic) at an inner surface of inner cavity 3. The nulls and maxima of the field pattern are spaced by 10 to 40 mm in azimuthal and longitudinal directions. Other spacing may also be used depending on the size of insects the bait station is targeted for. Insects crawling on the inner surface of the cavity will disturb the electromagnetic field pattern whenever they move a few millimeters.

It is unlikely that the insects such as termites will become airborne inside the bait station. However, the electromagnetic field pattern will still be disturbed under this condition.

The inner cavity openings 6 are positioned at the nulls of electromagnetic field pattern generated by the inner cavity transmission antenna 8. The entry of a single insect into inner cavity 3 and its traversal of the areas of field maxima and/or minima will cause a fluctuation in the electromagnetic field pattern. The receive antenna 10 will receive a time varying signal caused by the movement of the insect. This signal is then processed by microprocessor 24 so that minute changes due to the movement of the insect are detected differentially.

The outer cavity antenna 9 is energised to radiate a high order mode such as, but not restricted to the TEM variety. The high order TEM (Transverse Electromagnetic) resonant mode presents a pattern of nulls and maxima whose contours are circles spaced by 10 to 40 mm in the longitudinal direction. In one form, these nulls in the electromagnetic field can be designed to be spatially offset from the nulls of the corresponding TM patterns in inner cavity 3. Since the openings should be placed at the field nulls (in order to minimise electromagnetic coupling between the cavities) the outer cavity openings 7 can be deliberately offset from inner cavity openings 6 to discriminate against false detection due to rain, snow, dust, mud or other inanimate matter, which is subject to gravity and wind only. Such offsets are equivalent to baffles. The presence of any null between the two sets of openings guarantees that an insect will cause an electromagnetic field disturbance in the outer cavity whenever it enters or exits inner cavity 3.

In operation, if the electromagnetic field is disturbed in the outer cavity followed by increased activity in the inner cavity, then it is likely to be due to an insect entering the bait station. A reduction in the fluctuation of the electromagnetic field in the inner cavity followed by activity in the outer cavity is likely due to an insect exiting the bait station.

In a typical application, the bait station may be placed on the ground at an area of investigation. The inner cavity openings can be arranged so as to prevent extraneous materials from being either deposited by insects or naturally entering the inner cavity. Over time, foreign material may accumulate in the outer cavity, thereby degrading the TEM resonance in the outer cavity. The deterioration of the TEM resonance can be detected by the receive antenna 11. Microprocessor 24, either housed at the bait station or at a remote site can evaluate the degree of deterioration and generate a warning message alerting a user.

The outer cavity openings may also be made into baffles so that only materials carried by the insects can be carried inside the cavities other than large foreign material.

A drainage hole may be provided to drain any water, snow or ice collected in the bait station. Since the outer cavity slots are placed at nulls of the electromagnetic field pattern, very little electromagnetic field leaks out as radiation. This has several important ramifications:

1. The device is able to operate as an unlicensed sensor and is thus unencumbered by regulatory constraints relating to frequency of operation. Therefore, the cavity dimensions, resonant frequency and mode structure can be tailored to the detection of insect activity.
2. Because of the containment of the electromagnetic energy, much less power is needed for the detection process. This reduces battery consumption and simplifies transmitter design and reduces costs. The low coupling to the outside world also reduces interference from external clutter and external transmitters.

The processing of the received electromagnetic field signal will now be described. The signal received by receive antennas 10 and 11 may be analysed in terms of its magnitude and number of events per time interval. In this manner, the former relates to an insect size and the latter to insect number or activity of an insect.

Microprocessor 24 processes the stored digital signal to evaluate conditions in the bait station. The microprocessor may also process the stored data offline. The processing may be adaptive based on a library of recorded signals, or "learned" from stored historical data, including fuzzy logic and neural nets. The processing may involve the comparison between the observed signal and fixed or adaptive thresholds. Signals exceeding such thresholds may be identified and logged as alarm conditions and their particulars may be stored in memory.

In addition, alarm conditions may be used to trigger actuators used to aid in termite identification. For example, an electromagnetic, ultrasonic or electromechanical transducer or transducers, or chemical dispenser(s) may be activated to provoke (or inhibit) termite (or other insect) movement. The resulting changes in the received microwave signal may be used to improve the confidence level in the detection process, or improve the specificity of the detection with regards to the exact species of insect being detected. The details of the means of provocation may involve pulsing the said actuators at various repetition rates, with various duty cycles etc. The actual frequencies of electromagnetic disturbances may be tuned or variable, according to known information, or be adaptive, trying many combinations until a response is noticed or the variations exhausted.

Any activity in the cavities as registered with the receive antennas or alarm conditions generated may be sent to a remote central processor using an onboard bidirectional RF link 26 at the bait station, as shown in FIG. 6.

In an alternate form, the receive antennas may be interrogated periodically or on demand by the remote central processor. In this way, the raw or processed data or both can be stored in a remote location safe from adverse weather conditions or tampering. The data can include information about the received electromagnetic signal at the antennas, alarms conditions such as: cavity status, bait dispenser status, battery status, etc. Each data transmission to the remote central processor carries a date and time stamp.

It is expected that no activity would be detected for the majority of an observation period. Hence, to conserve battery power and memory space, the antennas are operated in a standby mode until activity that causes a change in electromagnetic field pattern is detected. In the standby mode, the antennas, RF link and microprocessor can be pulsed periodically or in a pseudorandom pattern. With the present system, it is possible to acquire an antenna reading or RF link activity within 1 ms of turn on. If no activity is detected, the next pulse can occur approximately 1 second later resulting in a maximum latency of 1 second.

During inactivity in the bait station, a duty cycle of 0.001 is attainable which provides an efficient operation of the bait station.

Figure 7:
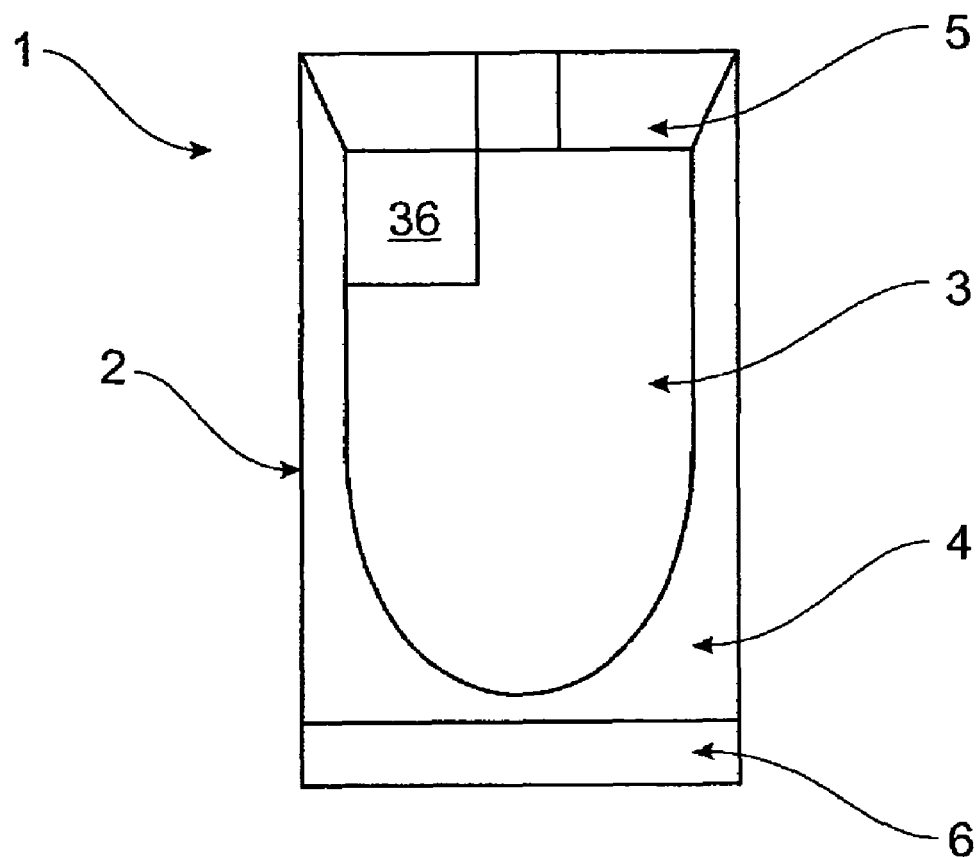
FIG. 7 is a schematic view of a second embodiment of a bait station in accordance with the invention.

As described in detail above, detection of insects or small animals is dependent upon movement within the inner and/or outer cavity that causes disruption of the electromagnetic field, thus producing a detectable signal. It is anticipated that an enhanced signal will be obtained if the insects or small animals are provoked to greater movement. As shown in FIG. 7, the bait station 1 may include a provocation means 36. The provocation means 36 is shown within the inner cavity 3, but may be elsewhere. The provocation can be achieved in a number of ways including mechanical, acoustic and chemical provocation.

A mechanical provocation could be a mechanical tapper that periodically generates noise and vibration by tapping the cavity wall. The mechanical tapper is operated on a low duty cycle synchronised with the signal detection duty cycle.

An acoustic provocation can be supplied with an ultrasonic source operating at a frequency known to be annoying to the insects or small animals. For example, high frequency signals are known to cause agitation in small animals.

Chemical provocation can be obtained by periodically dispensing a small quantity of pesticide by activating a solenoid to open a door to a storage chamber. As shown in FIG. 7, one side of the bait dispenser 5 may have attractant bait and the other side may have a chemical provocant that is released under control of the solenoid.

The bait station may be powered by standard battery packs. The active current drain is in the order of 150 mA at 6 volts. Hence, four standard AA batteries of 150 mAHr is sufficient to the power the antennas for 1000 hours or approximately forty (40) days in standby mode. The battery life may be slightly less with the addition of the provocation means.

In an alternate form, other types of rechargeable batteries may be used. Solar cells may be provided as auxiliary power or substitute for the battery packs. Any number of configurations are possible as it would be readily apparent to a person skilled in the art.

One advantage of the present invention is the bait station can be monitored remotely to evaluate the activities of pests and insects. The number of insects and activity habits can be monitored and evaluated over a period of time.

The invention has been described with reference to an exemplary embodiment. However, it should be noted that other embodiments are envisaged within the spirit and scope of the invention.

The invention claimed is:

1. A bait station comprising:
    a housing;
    an outer cavity formed within said housing;
    an inner cavity formed within said outer cavity;
    a plurality of openings for permitting insects or small animals to enter and exit said outer cavity and said inner cavity;
    at least one electromagnetic radiation element transmitting an electromagnetic field in each of said outer cavity and said inner cavity; and
    at least one electromagnetic receiving element detecting the electromagnetic field in each of said outer cavity and said inner cavity; wherein
    at least one electromagnetic receiving element detects changes in the electromagnetic field in each of said outer cavity and said inner cavity caused by ingress or egress of said insects or said small animals.

2. The bait station of claim 1 further comprising means for generating the electromagnetic field in signal connection with said electromagnetic radiation element.

3. The bait station of claim 1 further comprising means for processing received signals from said at least one electromagnetic receiving element.

4. The bait station of claim 1 wherein the electromagnetic field has minima and maxima spaced in azimuthal and/or longitudinal directions.

5. The bait station of claim 4 wherein the maxima and minima have a spacing in the range of 1 millimeter to 100 millimeters.

6. The bait station of claim 1 further comprising a bait in said housing.

7. The bait station of claim 1 further comprising memory means that stores data including one or more of: received electromagnetic field signal; status of said cavities; status of a bait dispenser; and status of a power supply.

8. The bait station of claim 1 further comprising an onboard bi-directional RF link for transmitting an activity data of the bait station to a remote location.

9. The bait station of claim 1 further comprising provocation means that causes increased movement of the insects or small animals.

10. The bait station of claim 1 wherein the inner cavity is coaxial with the outer cavity.

11. The bait station of claim 1 wherein the outer cavity is formed by an outer wall of the housing.

12. A method of detecting the presence of insects or small animals in a bait station having a housing, an outer cavity formed within said housing an inner cavity formed within said outer cavity and a plurality of openings permitting ingress or egress of insects or small animals, said method including the steps of:
    generating an electromagnetic field in each of said outer cavity and said inner cavity formed within the housing of said bait station; and
    detecting a change in the electromagnetic field in each of said outer cavity and said inner cavity caused by the ingress or egress of said insects or said small animals.

13. The method of claim 12 wherein the electromagnetic receiving element is interrogated periodically.

14. The method of claim 12 wherein the electromagnetic receiving element is interrogated on demand by a processor.

15. The method of claim 12 wherein the electromagnetic receiving element is interrogated with a duty cycle of 0.001.

16. The method of claim 12 wherein the electromagnetic receiving element operates in a standby mode until an activity in the bait station is detected.

17. The method of claim 16 wherein the activity is a change in the electromagnetic field is detected.

18. The method of claim 12 wherein the electromagnetic field is generated at a resonance frequency of the cavity.

19. The method of claim 12 wherein the electromagnetic field is radiated in a high order TEM resonant mode.

20. The method of claim 12 further including the step of provoking the insects or small animals to increased movement.

21. A method of detecting the presence of insects or small animals in a bait station having a housing enclosing an outer cavity and a coaxial inner cavity, and having a plurality of openings into said outer cavity and between said outer and inner cavities, said method including the steps of:

generating electromagnetic fields in said inner cavity and said outer cavity; and detecting a change in either or both electromagnetic fields caused by the ingress or egress of said insects or said small animals.

22. The method of claim 21 wherein a change in electromagnetic field in said inner cavity is compared to a change in electromagnetic field in said outer cavity to determine if said insects or small animals ingress or egress.

* * * * *